METHOD AND APPARATUS FOR MAGNETIC RECORDING AND REPRODUCING

Filed Jan. 29, 1962

INVENTOR.
GEORGE H. HARE
BY
Christie, Parker & Hale
ATTORNEYS.

3,239,824
METHOD AND APPARATUS FOR MAGNETIC RECORDING AND REPRODUCING

George H. Hare, Oakland, Calif., assignor to Burroughs Corporation, Detroit, Mich., a corporation of Michigan Filed Jan. 29, 1962, Ser. No. 169,250
2 Claims. (Cl. 340—174.1)

This invention relates to a method and apparatus for magnetic recording and, more particularly, to recording and reliably reproducing magnetically recorded information from magnetic surfaces that are stored in a fashion tending to cause the transfer of information from one magnetizable surface to the adjacent surface.

It is known that magnetic mediums in the form of tape or wire have a tendency to transfer or print its magnetic pattern on adjacent layers when they are stored on a reel. This transferred information interferes with the recorded information upon reproducing same and results in an objectionable background noise, and has been the subject of investigations to either compensate or eliminate this problem.

Magnetic mediums have been utilized in high speed data processing devices and systems and a magnetic storage apparatus employing a plurality of cards, stacked side by side, has been proposed. In one particular arrangement of this storage apparatus the magnetic cards are provided with a magnetizable surface on both sides thereof and are placed in the stack with the adjacent surfaces of the cards in intimate contact whereby the tendency to transfer or print through the magnetic information onto the adjacent layer is greatly increased.

The advantage of utilizing cards having magnetizable surfaces on both sides is that the storage capacity of the storage apparatus is doubled over the same apparatus utilizing cards having one side magnetically coated but in which the transfer or "print-across" problem is not very serious. The capacity of magnetic storage apparatus for data processing applications is a very important factor in the cost of the data processing apparatus on a cost per item or bit basis. Therefore, the advantage of utilizing magnetic elements or cards of double storage capacity over those used in the prior art and that can be closely stacked side by side is clear.

Accordingly, a method and apparatus for recording and reliably reproducing information recorded on the magnetizable surfaces that are stored side by side in intimate relationship and that obviates the background noises due to the information transferred between surfaces is a necessity.

This invention provides an improved method and apparatus for reliably reproducing magnetic information, including binary coded information, from a stack of magnetic elements or cards having magnetizable surfaces on opposite sides thereof and stored in a stack side by side with magnetizable surfaces of adjacent cards in intimate relationship whereby the information is transferred between adjacent magnetizable surfaces but upon reproducing the previously recorded information the background noise is minimized as a result of the skewed recording and reproducing technique disclosed. Specifically, the magnetic information is recorded in a track in the usual fashion but with a recording and/or reproducing transducer having the transducing gap inclined at a preselected angle with respect to the normal to the line through the recording track axis in the plane of the magnetizable surface whereby the recorded information assumes the preselected angle. Each of the magnetic surfaces, including the adjacent stacked magnetic surface, has the information recorded at the preselected angle whereby upon transfer of information due to physical contact between the adjacent magnetic elements the angle defined between the recorded information and the transferred information is approximately twice the preselected angle. Accordingly, upon reproducing information from a preselected magnetic element that not only has been previously recorded but includes the transferred information thereon, the transducing gap of the reproducing transducer is oriented in a plane substantially parallel to the recording track whereby the transducing gap is aligned at the preselected angle with the skewed signals previously recorded but assums an angular relationship with respect to the transferred information and which transferred information is only partially reproduced.

These and other features of the present invention may be more fully appreciated when considered in the light of the following specification and drawings, in which.

Figure 1:
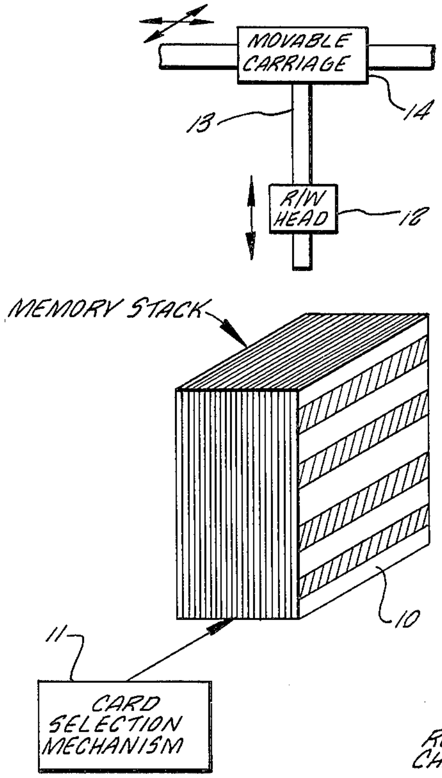
FIGURE 1 is a schematic diagram of the general organization of the magnetic storage apparatus wherein the invention may be employed.

Now referring to FIG. 1 the general organization of a magnetic storage apparatus of the type wherein the invention may be employed will be examined. The memory apparatus comprises a plurality of stacked memory cards 10 provided with magnetizable surfaces on both sides thereof. Each of the memory elements or cards 10 are provided with coded indentations or marks (not shown) for cooperation with a selecting finger that is controlled by the card selection mechanism shown in block form and identified by the reference character 11.

As it will be appreciated by those skilled in the art, coded signals corresponding to a particular card 10 are delivered to the card selection mechanism 11 to cause the selection finger to locate a particular card and open up the memory stack to allow a transducing operation to be effected. To this end, the magnetic transducer, which may comprise a combined read and write head 12, is mounted on a movable arm 13 which is, in turn, mounted with a movable carriage represented by the block 14. The arm 13 is vertically movable into and out of the memory stack 10 upon the selection of a particular card 10 and is controlled to be placed opposite the area or channel on the card or cards to be operated on. It will be appreciated that the read and write head 12 is positioned at the selected card through the controlled movement of the movable carriage 14 by means of additional control apparatus (not shown).

It should be noted that each of the magnetic elements or cards 10 are provided with a magnetizable recording surface on both sides thereof (see FIG. 2) and are stacked in intimate relationship with one another, as shown. Examining a memory card 10 of the type shown in FIG. 2, it will be seen that each side of a card 10 is provided with a plurality of recording channels arranged in a parallel relationship. Each recording channel includes a plurality of recording tracks whereby coded information may be recorded, bit by bit, for example when binary coded information is recorded in the different tracks in a direction transverse to the axis of the recording channel and the group of bits comprise a piece of information or a word. This organization of the recording channels is merely exemplary and it will be recognized that the recording channels can be aligned vertically on the cards or in any other convenient fashion. It will be recognized by those skilled in the art that the organization of the apparatus described is conventional and that in conventional recording the magnetic bits in the plurality of tracks are aligned transverse to the normal to the line through the track axis in the plane of the recording surface and, therefore, any magnetic information "printed through" assumes a substantially parallel or superimposed relationship with the recorded information.

It is an important feature of this invention that the information is recorded on the cards 10 in a fashion to minimize "print through" through the orientation of the recorded information on the magnetizable surface and the corresponding orientation of the transducing gaps for a magnetic transducer to cause the transducing gaps to be aligned with the magnetic signals as they were placed by the recording head at a preselected angle whereby the transferred information assumes a misaligned angle with regard to the transducing gaps and thereby only a small portion of the transferred information is detected and reproduced with the reproduction of the desired information or the magnetic information aligned with the transducing gap.

Figure 3:
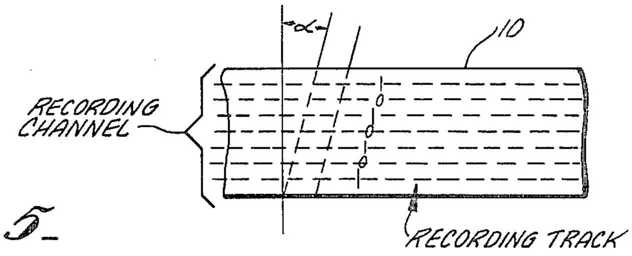
FIGURE 3 is a diagrammatic representation of a single recording channel comprising a plurality of tracks therein and illustrating the recording angle.
Figure 5:
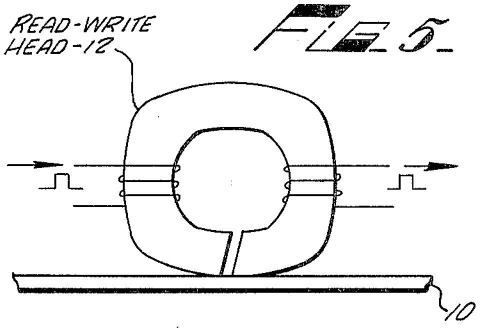
FIGURE 5 is a schematic representation of a magnetic transducer having a skewed transducing gap and embodying the invention.
Figure 6:
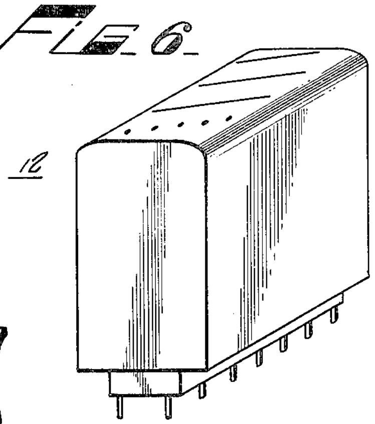
FIGURE 6 is a pictorial view of a multiple track magnetic transducer of the type of FIG. 5.

This invention proposes to record magnetic information, for example binary coded signals, in a recording channel of a recording medium wherein a plurality of tracks are utilized but wherein the magnetic bits comprising a single word are inclined with respect to the normal line through the track axis in the plane of the recording surface by an angle on the order of 15 degrees. This angle is shown in FIG. 3 and represented by the character $\alpha$.

Figure 2:
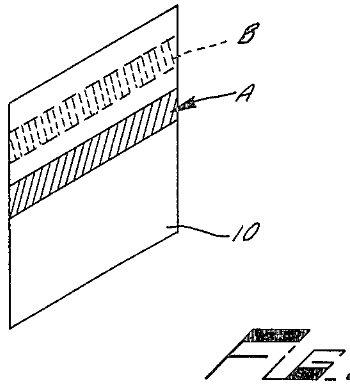
FIGURE 2 is a diagrammatic representation of a memory element for use in the apparatus of FIG. 1 and embodying the invention.
Figure 4:
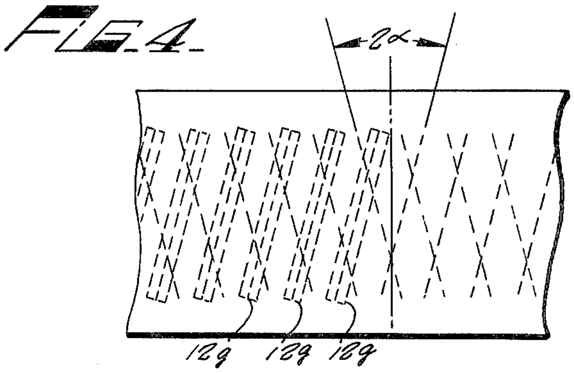
FIGURE 4 is a diagrammatic representation of a single recording channel showing the angular relationship of the recorded information and the transferred information relative to a magnetic reproducer.

A magnetic card 10 having information recorded on both sides thereof at the preselected angle is shown in FIG. 2 wherein the front side of the card has a recording track A shown with the information recorded therein at the preselected angle and the opposite side of the card has a track B with the information recorded at the same preselected angle. Each word or piece of information is represented by a dotted line in the drawings. It should be noted that the information recorded in the tracks on both sides of a magnetic element 10 is oriented at the same preselected angle and rotated in the same direction with regard to the normal to the track axis. When the sides of cards 10 are placed side by side, the orientation of the information on these adjacent surfaces or recording channels is oriented in opposite directions with regard to the normal to the line through any one track axis. Therefore, the angle defined between the recorded information in a particular track and the transferred information will be approximately twice the preselected angle, or $2\alpha$. This arrangement is more evident from an examination of FIG. 4. The desired information in the recording track shown in FIG. 4 is defined at the preselected angle but oriented in a clockwise sense with respect to the normal to the track axis while the transferred information assumes this angle in a counterclockwise sense whereby the angle defined between these two words is $2\alpha$.

The magnetic transducer 12, which may be a combined reading and writing head for simultaneously writing in the plurality of tracks for a channel of the card 10, has its transducing gaps oriented at the preselected angle to cause the binary coded information to be recorded in the various tracks and assume the angle $\alpha$, as described. The transducer 12 is positioned on the arm 13 to place the magnetic transducer 12 in alignment with a recording channel on a magnetic card 10 with the transducing gaps aligned with the previously recorded signals in a substantially parallel relationship with these signals. This arrangement is shown in FIG. 4 wherein the orientation of the transducing gaps for the head 12 are represented in dotted outline superimposed over the recorded information and identified by the reference characters $\mathbf{12}^g$. An examination of FIG. 4 will indicate that with the transducing gaps arranged and positioned in this fashion for reproducing the information in any one track that only a very small portion of the transferred information will be detected by the transducer as a result of the definition of the angle $2\alpha$ with regard to these transducing gaps. Stated differently, with regard to the diagrammatic view of FIG. 4, very little of the transferred information falls within the dotted outline $\mathbf{12}^g$ and, therefore, only this portion of the transferred information will be reproduced. To this same end, all the desired information falls within the dotted outline $\mathbf{12}^g$ and is reproduced.

Although the preselected angle has been indicated as 15 degrees, it should be noted that any other angle leading to the reduction in noise level due to the decoupling of the transferred information or "print-through" with respect to a transducer may be selected. With the skew angle of 15 degrees, the noise level is reduced by a factor of ten or more and, therefore, is entirely satisfactory for use in data processing applications, wherein the track widths are on the order of 0.020 to 0.045 inch.

What is claimed is:

1. A method of recording and reliably reproducing from storage information magnetically stored on record cards having a magnetic surface on both sides of the cards and which cards are stored in intimate contact with one another whereby the magnetic information on one record card is transferred through contact to the adjacent magnetic surface of a card stored in intimate contact therewith, said method including magnetically recording information in a plurality of tracks in at least a single channel on at least a pair of record cards with the information being recorded at a preselected angle $\alpha$ inclined with respect to the normal to the line through the recording channel axis in the plane of the magnetic surfaces of said cards, storing at least a pair of record cards so that the recorded information on one side of the record card is transferred to the recording channel on another record card stored in intimate contact therewith whereby the recording channels for said record cards comprise the recorded information transferred from the corresponding track as well as that intentionally recorded therein, the transferred information and the recorded information defining an angle two $\alpha$ relative to one another, and reproducing the recorded information from one of said recording channels of a record card through the provision of a magnetic transducer having a transducing gap for each track and wherein the gaps are arranged to assume an angle $\alpha$ with respect to the normal to the line through the recording track axis in the plane of the magnetic surface of said card to thereby assume a substantially parallel relationship only with the recorded information and a substantially decoupled relationship with the transferred information.

2. A method of recording and reliably reproducing from storage information magnetically stored on record cards as defined in claim 1 wherein the angle $\alpha$ is at least 15 degrees.

References Cited by the Examiner

UNITED STATES PATENTS

| | | | |
|---|---|---|---|
| 2,496,047 | 1/1950 | Goddard | 179—100.2 |
| 2,832,839 | 4/1958 | Muffly | 179—100.2 X |
| 2,937,239 | 5/1960 | Garber et al. | 179—100.2 |
| 2,940,068 | 6/1960 | Stiefel | 340—174.1 X |
| 2,989,595 | 6/1961 | Hunter | 179—100.2 |

BERNARD KONICK, *Primary Examiner.*

IRVING L. SRAGOW, *Examiner.*